US010488107B2

(12) United States Patent
Krogh

(10) Patent No.: US 10,488,107 B2
(45) Date of Patent: Nov. 26, 2019

(54) AIR DISPERSER COMPRISING A GUIDE VANE FRAMEWORK FOR A SPRAY DRYING APPARATUS, AND METHOD FOR ASSEMBLING SUCH AN AIR DISPERSER IN A SPRAY DRYING APPARATUS

(71) Applicant: GEA Process Engineering A/S, Søborg (DK)

(72) Inventor: Kristian Krogh, Copenhagen S (DK)

(73) Assignee: GEA PROCESS ENGINEERING A/S (DK)

( * ) Notice: Subject to any disclaimer, the term of this patent is extended or adjusted under 35 U.S.C. 154(b) by 0 days.

(21) Appl. No.: 15/315,875

(22) PCT Filed: Jun. 4, 2014

(86) PCT No.: PCT/DK2014/050159
§ 371 (c)(1),
(2) Date: Dec. 2, 2016

(87) PCT Pub. No.: WO2015/185059
PCT Pub. Date: Dec. 10, 2015

(65) Prior Publication Data
US 2017/0108271 A1    Apr. 20, 2017

(51) Int. Cl.
*F26B 3/12* (2006.01)
*B05B 1/06* (2006.01)
(Continued)

(52) U.S. Cl.
CPC ............ *F26B 3/12* (2013.01); *B01D 1/18* (2013.01); *B01D 1/20* (2013.01); *B23P 19/00* (2013.01)

(58) Field of Classification Search
CPC .. F26B 3/12; F26B 3/082; F26B 21/00; F26B 21/004; B01B 1/16; B01B 1/18;
(Continued)

(56) References Cited

U.S. PATENT DOCUMENTS 4,226,603 A     10/1980  Larsson et al.
4,227,896 A *   10/1980  Larsson ................... B01D 1/18
                                                       159/4.2
(Continued)

FOREIGN PATENT DOCUMENTS

CN     101340957 A    1/2009
JP     55-31490 A     3/1980
(Continued)

*Primary Examiner* — Gregory A Wilson
(74) *Attorney, Agent, or Firm* — Condo Roccia Koptiw LLP

(57) ABSTRACT

The air disperser (4) for a spray drying apparatus has an air inlet (81) leading to a space (45) defined within an inner radius and an outer radius in which a set of guide vanes (7) is positioned. A top, a bottom and an outer circumferential wall are defined, and an air outlet (82) at the inner radius is adapted to be positioned above a feed outlet from atomizing means. Each guide vane (7) has a pre-defined length in the radial direction. At least the bottom and outer wall of said space (45) are provided by a base module (5). The top is provided by a top plate (6) and the set of guide vanes (7) is releasably secured to a fixating device (10, 11) to form a framework, and the framework is secured relative to the base module (5) in the axial direction by the top plate (6).

24 Claims, 6 Drawing Sheets

(51) Int. Cl.
*B01D 1/18* (2006.01)
*B01D 1/20* (2006.01)
*B23P 19/00* (2006.01)

(58) Field of Classification Search
CPC .. B01B 1/20; B01B 53/14; B05B 1/00; B05B 1/005; B05B 1/06; B23P 19/00; B23P 19/02; B23P 15/001; B23P 15/008; B23P 25/006; F01D 1/02
See application file for complete search history.

(56) References Cited

U.S. PATENT DOCUMENTS

| | | | | |
|---|---|---|---|---|
| 4,619,404 A * | 10/1986 | Rasmussen | ........... | B05B 7/0075 239/424 |
| 5,227,018 A | 7/1993 | Bro et al. | | |
| 5,651,904 A * | 7/1997 | Franke | ................. | B23K 7/008 219/121.67 |
| 7,261,248 B2 * | 8/2007 | Curtis | ....................... | B05B 1/26 241/38 |
| 8,157,249 B2 * | 4/2012 | Hansen | .................... | B01D 1/18 261/78.2 |
| 2009/0008805 A1 * | 1/2009 | Hansen | .................... | B01D 1/18 261/78.2 |
| 2009/0091049 A1 * | 4/2009 | Nielsen | ...................... | B01J 2/16 264/12 |
| 2010/0266400 A1 * | 10/2010 | Avedon | ................. | F04D 29/542 415/209.3 |
| 2012/0195749 A1 * | 8/2012 | Avedon | ................. | F04D 25/088 415/211.2 |
| 2012/0292407 A1 * | 11/2012 | Mornan | .................. | F24F 7/025 239/461 |
| 2013/0011254 A1 * | 1/2013 | Avedon | .................... | F04D 25/08 415/221 |
| 2014/0083627 A1 * | 3/2014 | Khan | ..................... | B01D 1/0082 159/4.01 |

FOREIGN PATENT DOCUMENTS

| | | |
|---|---|---|
| JP | 5-22025 U | 3/1993 |
| JP | 5-504090 A | 7/1993 |
| JP | 5-76291 U | 10/1993 |
| WO | WO 1991/004776 A1 | 4/1991 |
| WO | WO 2007/071238 A1 | 12/2005 |
| WO | WO 2011/047676 A1 | 4/2011 |
| WO | WO 2014/051878 A1 | 4/2014 |
| WO | WO-2015185060 A1 * | 12/2015 ............... B01D 1/18 |

* cited by examiner

AIR DISPERSER COMPRISING A GUIDE VANE FRAMEWORK FOR A SPRAY DRYING APPARATUS, AND METHOD FOR ASSEMBLING SUCH AN AIR DISPERSER IN A SPRAY DRYING APPARATUS

CROSS REFERENCE TO RELATED APPLICATIONS

This application is the National Stage Entry under 35 U.S.C. § 371 of Patent Cooperation Treaty Application No. PCT/DK2014/050159, filed 4 Jun. 2014 the contents of which are hereby incorporated by reference herein.

FIELD OF THE INVENTION

The present invention relates to an air disperser for a spray drying apparatus, having a longitudinal axis defining an axial direction and a radial direction extending perpendicularly to the axial direction, and comprising an air inlet leading to a space defined within an inner radius and an outer radius, and having a top, a bottom and an outer circumferential wall, a set of guide vanes, and an air outlet at said inner radius adapted to be positioned above a feed outlet from atomizing means, each guide vane of said set having a pre-defined length in the radial direction and being located in said space between the inner and the outer radii, substantially vertically in the axial direction.

BACKGROUND OF THE INVENTION

In general, spray drying may be performed in many ways, and to all varieties it applies that the air distribution in the spray drying apparatus is one of the most vital parts. There are various systems depending on the plant design and the type of product to be produced. Different designs or adjustment of air dispersers are used in spray dryers to achieve either roughly a straight "plug-flow" air stream or a swirling air stream. The most common is that the air disperser is situated on top of the spray dryer ceiling, and the atomizing device(s) is/are placed at the middle of the air disperser thus ensuring an optimal mixing of the air and the atomized droplets.

The set of guide vanes is arranged in a guide vane framework to provide the distribution of drying air inside of the air disperser. Examples of prior art air dispersers incorporating such a framework are U.S. Pat. No. 4,227,896 (Niro) and WO 2007/071238 A1 (Niro).

In the latter document, the air disperser comprises a plurality of guide vanes positioned substantially vertically in the axial direction and substantially on the radii in a space defined by the pipe wall and the outer wall of the air disperser, and at least one of the guide vanes is covering at least 90% of the full radius from the pipe wall surrounding the atomizing means, in the direction towards the outer wall of the air disperser, and the rest of said guide vanes are distributed on radii along the circumference of the pipe. The guide vanes are traditionally welded to a nearby part or parts of the air disperser.

Although this air disperser provides for reliable operation, the manner of manufacturing of the air disperser is relatively cumbersome and entails some disadvantages, as each guide vane must be welded in the exact position. In addition to the increased demand of manufacturing resources, the welding itself inevitably leads to slight deformations which in turn may lead to a reduced precision in the air flow. Furthermore, in certain fields of application, hygiene is a key factor and thorough cleaning of all parts of the air disperser is essential.

SUMMARY OF THE INVENTION

It is an object of the invention to provide an air disperser for a spray drying apparatus, in which the conditions of manufacture and operation are improved.

In a first aspect, this and further objects are achieved by the provision of an air disperser of the kind mentioned in the introduction, which is furthermore characterized in that at least the bottom and outer wall of said space are provided by a base module, that the top is provided by a top plate, that said set of guide vanes is releasably secured to a fixating device to form a framework, and that said framework is secured relative to the base module in the axial direction by the top plate.

In this manner, the framework including the guide vanes connected by the fixating device may be handled as a separate unit which in turn is secured to the base module by positive engagement or fit-locking only, i.e. without the use of bolts or the like, by mounting the top plate on top of the base module, thus enclosing the framework in the space provided in the base module. Accordingly, the guide vanes may be separated from the fixating device in a simple disassembly operation, and subsequently cleaned, just as the base module may be cleaned separately, once the framework including the guide vanes and the fixating device have been removed. Correspondingly, the framework may readily be reinserted into the base module when assembling the air disperser following cleaning. Moreover, the number of guide vanes may be varied according to need, and thus, a set of guide vanes may vary both as regards size and number to the particular field of application of the air disperser. Eventually, as the framework including the set of guide vanes is secured by means of the fixating device, welding may be reduced to a minimum.

By the term "air disperser" as used herein is meant any disperser supplied with a drying gas to be used in the spray dryer. A skilled person will know that air is often used as the drying gas when the liquid to be atomized is an aqueous solution, while an inert gas, such as e.g. nitrogen, is more likely used, when the liquid to be atomized is a non-aqueous solution or oxidation of the product must be avoided. Consequently, the term "drying air" covers all types of drying gas, which may be used in the spray drying process. Additionally, the term "spray drying" should be interpreted as embracing any process including drying, cooling and conditioning of a feed.

Regarding the term "releasable" etc. it is noted that this should be interpreted as including any connection that is easily secured and released, substantially without the use of tools, and without breaking of substantial permanent connections or joints such as welded joints, sealing members etc.

In one preferred embodiment, the fixating device comprises at least one ring arranged substantially concentrically to the inner and outer radius, each at least one ring having a radius in the range from the inner radius to the outer radius. The ring or rings provide(s) a well-defined position and makes it possible to secure the set of guide vanes to the fixating device and in turn to the base module of the air disperser in a reliable and reproducible manner.

In a further development of this preferred embodiment, the fixating device comprises two or more rings, each ring having a different radius in the range from the inner radius to the outer radius. This increases the stability of the framework and improves the accuracy of the position of the set of vanes even further.

In principle, the set of guide vanes may be connected to the fixating device and secured to the base module in any suitable manner allowing the set of guide vanes to be releasably secured. In one embodiment, which is mechanically simple, yet reliable, the ring(s) and/or the set of guide vanes comprise(s) engagement means allowing releasable engagement between said at least one ring and the set of guide vanes in said framework. In a further development of this embodiment, the engagement means comprise at least one slit formed in each guide vane to receive a respective ring, each ring being preferably provided with a corresponding slit.

In order to increase the precision even further, a further embodiment provides the base module and/or the fixating device with retention means preventing rotational movement of the framework including the set of guide vanes and the fixating device relative to the base module. In a development of this embodiment, the retention means comprise protrusions formed in the base module to cooperate with corresponding apertures in the respective ring The shape of the guide vanes may take any suitable form; however, in one embodiment the guide vanes are provided with an upper edge having a curved cornute-like shape with a height at the inner radius which is smaller than the height at the outer radius.

In order to close off the space provided in the base module and in which the set of guide vanes is positioned and still provide relatively easy access to the framework including the set of guide vanes and the fixating device, the top plate, optionally a two-part top plate, closing off said space may be releasably connected to the base module by securing means. This provides for a dependable closure while at the same time allowing relatively easy access. In one embodiment, the top plate has a shape corresponding to the upper edge of the guide vanes in part or in full.

The length of the individual guide vanes are advantageously calculated to distribute the air flow in an even manner in the horizontal plane, taking into account the place and design of the air inlet to the air disperser. The air inlet may be tangential or radial to the air disperser. In a further preferred embodiment providing this advantage, at least some guide vanes of the set of guide vanes may have different lengths measured in the radial direction.

In a further preferred embodiment, the base module is formed as a double-walled unit comprising a lower portion and an upper portion, and wherein the bottom and outer wall of said space are formed by the upper portion. The base module may thus be utilized throughout a range of air dispersers, in which the set of guide vanes and the space in which the guide vanes are positioned are adapted to the specific need, while the base module remains the same.

To improve the operating conditions, an insulating material may be inserted between the lower portion and the upper portion of the base module.

The base module may be formed as one integral element; however, in one embodiment which is advantageous as regards manufacturing conditions, the lower portion and the upper portion are connected to each other by means of at least one connecting element.

The air disperser may also be provided with an insulating module for releasable connection with said base module and optionally said top plate. This improves the operating conditions even further, and at the same time, the insulating module provides an outer surface of the air disperser.

A separate air inlet part may be provided to be connected to the base module.

The air disperser according to the first aspect of the invention may be used in suitable types of spray drying apparatus. The air disperser may be used in the traditional way, i.e. by mounting the air disperser to the ceiling of the drying chamber. In an advantageous application of the embodiments incorporating a double-walled base module, the lower portion of the base module is adapted to form the ceiling of the drying chamber of a spray drying apparatus.

In a second aspect, a method for assembling an air disperser of a spray drying apparatus is provided.

By providing positive releasable engagement between the set of guide vanes and the fixating device, and in turn with the base module to prevent movement of the set of guide vanes in the radial, tangential and axial direction, the assembly of the air disperser in the spray drying apparatus is facilitated and easy access and disassembly is made possible.

Further details and advantages will appear from the detailed description and appended claims.

BRIEF DESCRIPTION OF THE DRAWINGS

In the following, the invention will be described in further detail by means of the following description of preferred embodiments and with reference to the drawings, in which.

DETAILED DESCRIPTION OF THE INVENTION AND OF PREFERRED EMBODIMENTS

Figure 1:
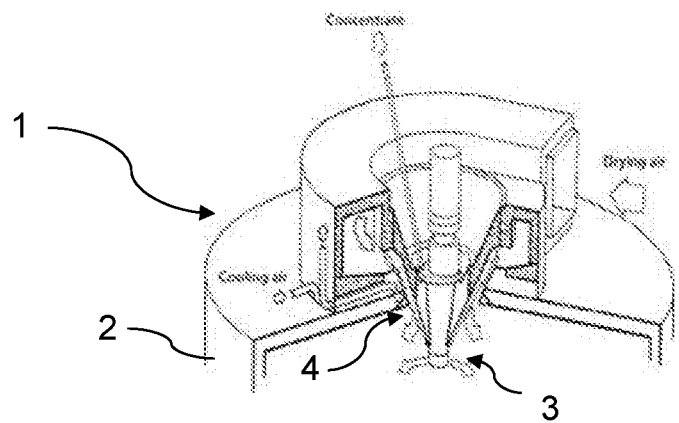
FIG. 1 shows a partial perspective and sectional view of a prior art air disperser mounted in the ceiling of a spray drying apparatus.
Figure 2:
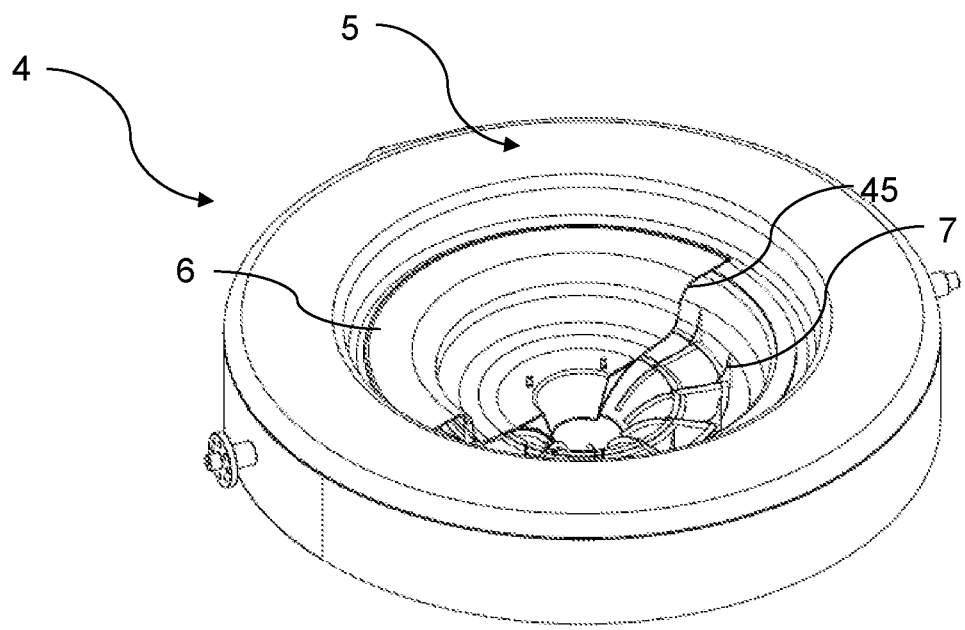
FIGS. 2 and 3 show partial perspective and sectional views of an air disperser in a first embodiment of the invention.
Figure 3:
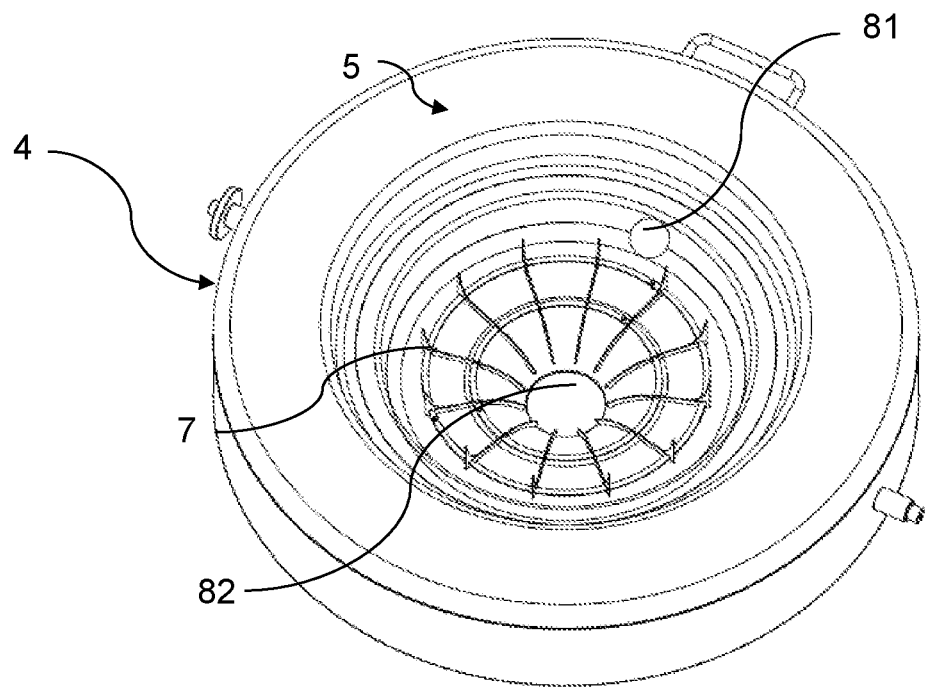

In FIG. 1, relevant parts of the top of a prior art spray drying apparatus generally designated 1 are shown. The spray drying apparatus 1 comprises a drying chamber 2 to which a feed to be spray dried is introduced at the top thereof by means of suitable atomizing means 3 and is set into a, possibly swirling, downward movement in the drying chamber 2 by drying air introduced via an air disperser generally designated 4 mounted at the ceiling of the drying chamber 2 of the spray drying apparatus. The spray drying apparatus may for instance form part of a spray drying plant in which further components are present, in which the drying process and other processes associated with the drying of materials are carried out.

Referring now to FIGS. 2 to 10, a first embodiment of an air disperser designated 4 according to the present invention will be described in some detail. It is noted that parts of a spray drying apparatus, in which the air disperser according to the invention is adapted to be built into, may correspond to those of the prior art apparatus, but may also vary in some details.

Figure 9:
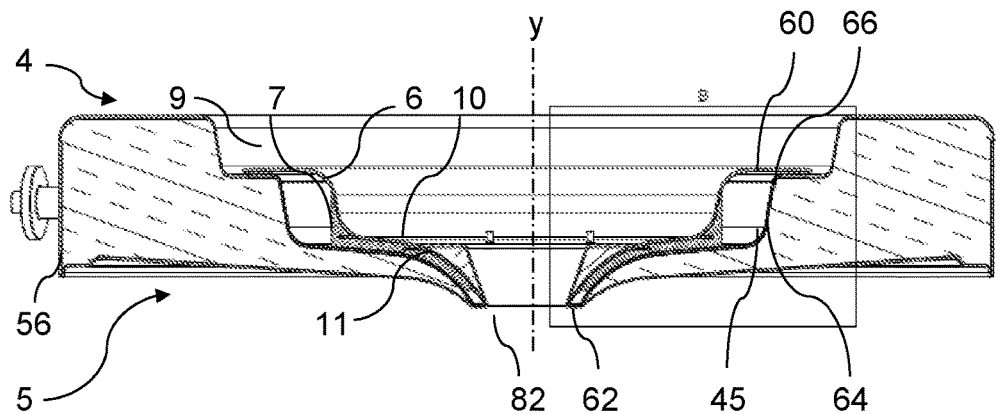
FIG. 9 is a sectional view, on a larger scale, of the air disperser of FIG. 8, along the line A-A.
Figure 10:
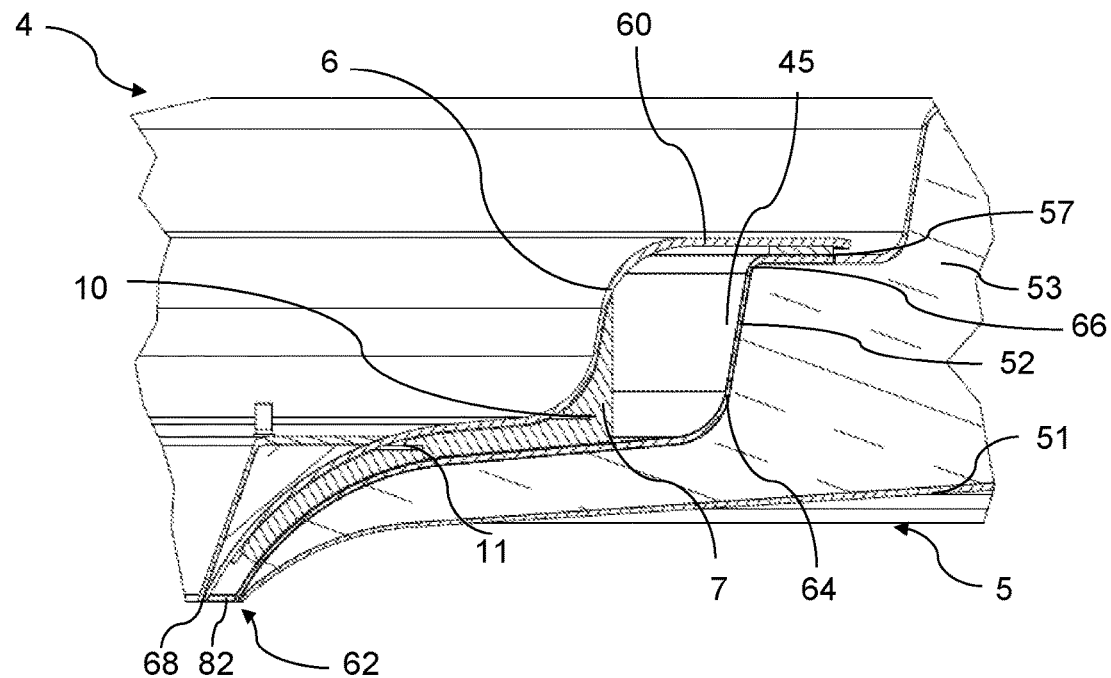
FIG. 10 is a partial sectional view, on a still larger scale, of section B of FIG. 9.

The air disperser 4 has a longitudinal axis defining an axial direction and a radial direction extending perpendicularly to the axial direction. The axial direction y is indicated in FIG. 9. The air disperser is connected to a supply of drying air or gas, in the embodiment shown via a separate air inlet part 8, and has an air inlet 81 leading to a space 45 defined within an inner radius 68 and an outer radius 66. The space 45 is, as shown most clearly in FIGS. 10 and 11, delimited by a top 60, a bottom 62 and an outer circumferential wall 64. In the embodiment shown, the top 60 is provided by top plate 6 and the bottom 62 and the outer circumferential wall 64 by a base module 5 constructed as will be described in further detail below. A set of guide vanes 7 is positioned within the space 45. An air outlet 82 is present at the inner radius 68 and, in the mounted condition, surrounds a feed outlet of atomizing means such as a nozzle or a rotary atomizer.

Each guide vane 7 of said set having a pre-defined length in the radial direction and is located in the space 45 between the inner and the outer radii, substantially vertically in the axial direction. The guide vanes 7 are releasably secured relative to the base module 5 by means of a fixating device 10, 11 and by positive engagement only. In the embodiment shown, the fixating device comprises two rings 10, 11 arranged substantially concentrically to the inner and outer radius, each at least one ring having a radius in the range from the inner radius to the outer radius, and wherein the guide vanes 7 are connected to the ring or rings and secured relative to the base module 5. All in all, this entails that the guide vanes may be removed from the base module without tools or removing weldings.

As indicated, the fixating device comprises two or more rings, each ring 10, 11 having a different radius in the range from the inner radius to the outer radius. The fixating device comprises engagement means allowing releasable engagement between said at least one ring 10, 11 and the guide vanes 7.

Figure 4:
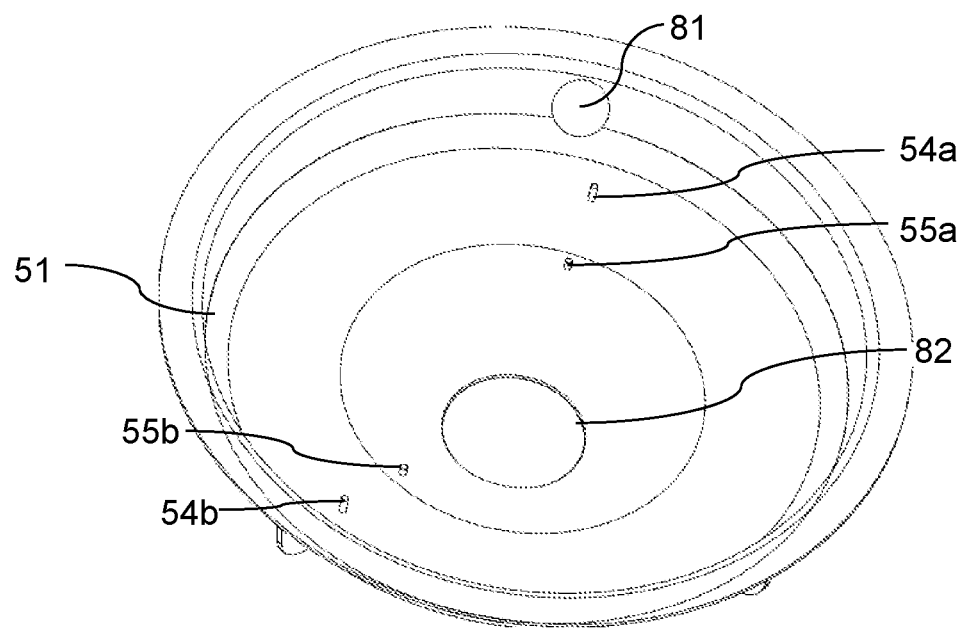
FIG. 4 is a perspective view of a detail of the air disperser shown in FIGS. 2 and 3.
Figure 5:
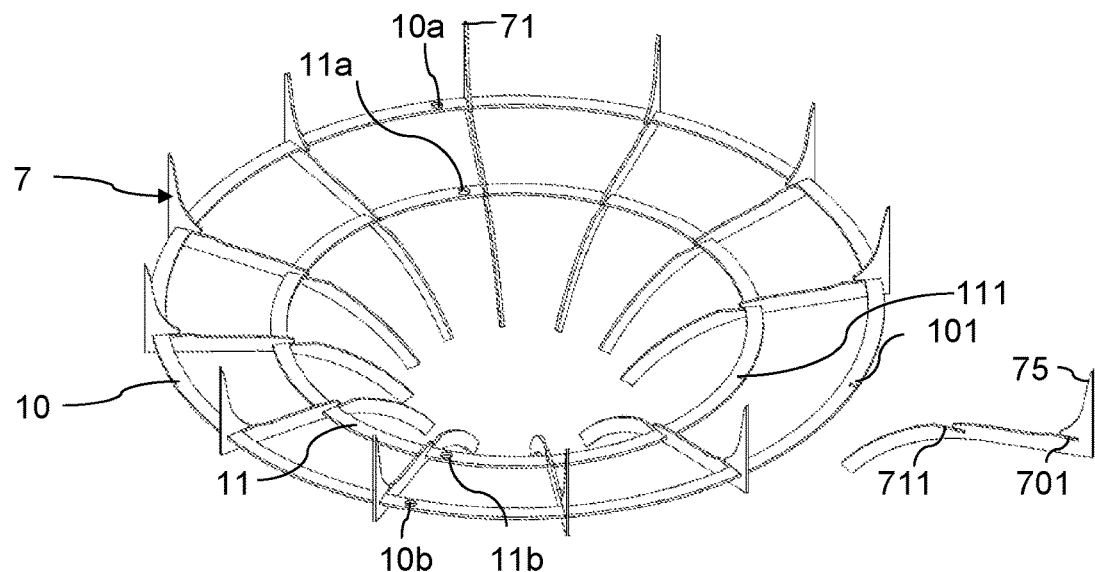
FIG. 5 is a perspective view of details of the air disperser shown in FIGS. 2 and 3, showing the framework including guide vanes and fixating device.
Figure 6:
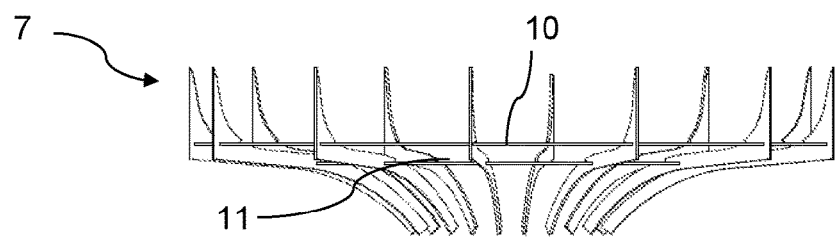
FIG. 6 is a side view of the framework shown in FIG. 5.
Figure 7:
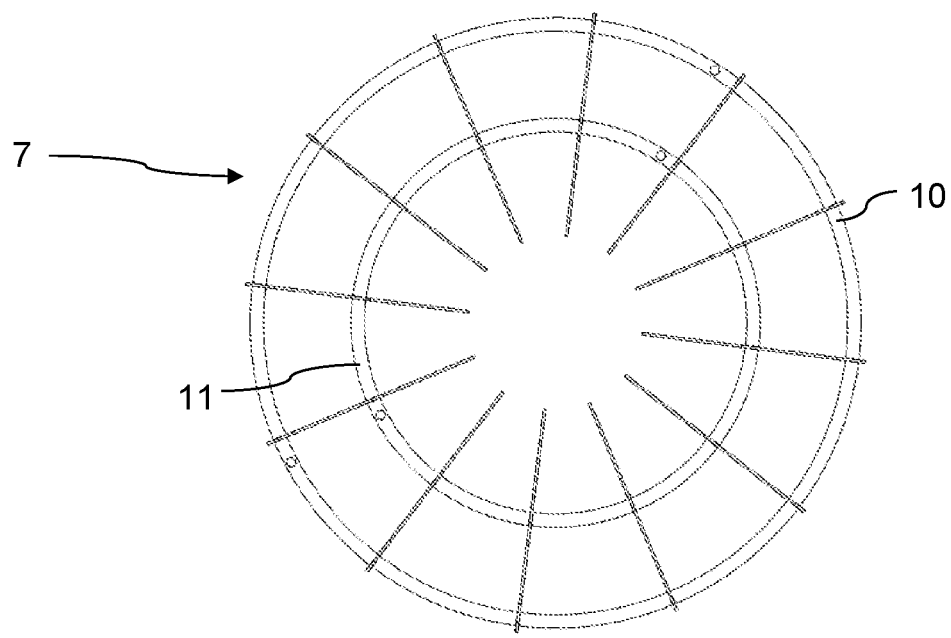
FIG. 7 is a top view of the framework shown in FIG. 5.

Referring in particular to the detailed views of FIGS. 4 and 5, the engagement of the set of guide vanes and the fixation device to form a framework, and the securing to the base module will be described in more detail. In the embodiment shown, the rings 10, 11 constituting the fixating device and the set of guide vanes each comprises engagement means allowing releasable engagement between the rings 10, 11 and the set of guide vanes 7 in the framework.

The engagement means comprise at least one slit, here two slits 701, 711 formed in each guide vane of the set of guide vanes 7, here represented by guide vane marked 75 to receive a respective ring 10, 11. This could in principle be sufficient, but in the embodiment shown, each ring 10, 11 is provided with a corresponding slit 101, 111. Thus slit 701 cooperates with slit 101 and slit 711 with slit 111. In this manner, the set of guide vanes 7 is locked to the rings 10, 11 constituting the fixating device in the embodiment shown, not only in the axial direction but also prevented from rotating relative to the rings 10, 11.

To prevent rotational movement of the framework including the set of guide vanes 7 and the fixating device 10, 11 relative to the base module 5, the base module 5 and/or fixating device 10, 11 comprise(s) retention means. In the embodiment shown, the retention means comprise protrusions 54a, 54b, 55a, 55b formed in the base module 5 to cooperate with corresponding apertures 10a, 10b, 11a, 11b in the respective ring 10, 11.

In the embodiment shown in FIGS. 2 to 11, the base module 5 is formed as a double-walled unit comprising a lower portion 51 and an upper portion 52, and wherein the bottom and outer wall of space 45 are formed by the upper portion 52. As shown most clearly in the detailed view of FIG. 10, the air disperser is provided with an insulating material 53 inserted between the lower portion 51 and the upper portion 52.

At the periphery of the base module 5 of the air disperser in the embodiment shown, the lower portion 51 and the upper portion 52 are connected to each other by means of a connecting element 56.

Figure 8:
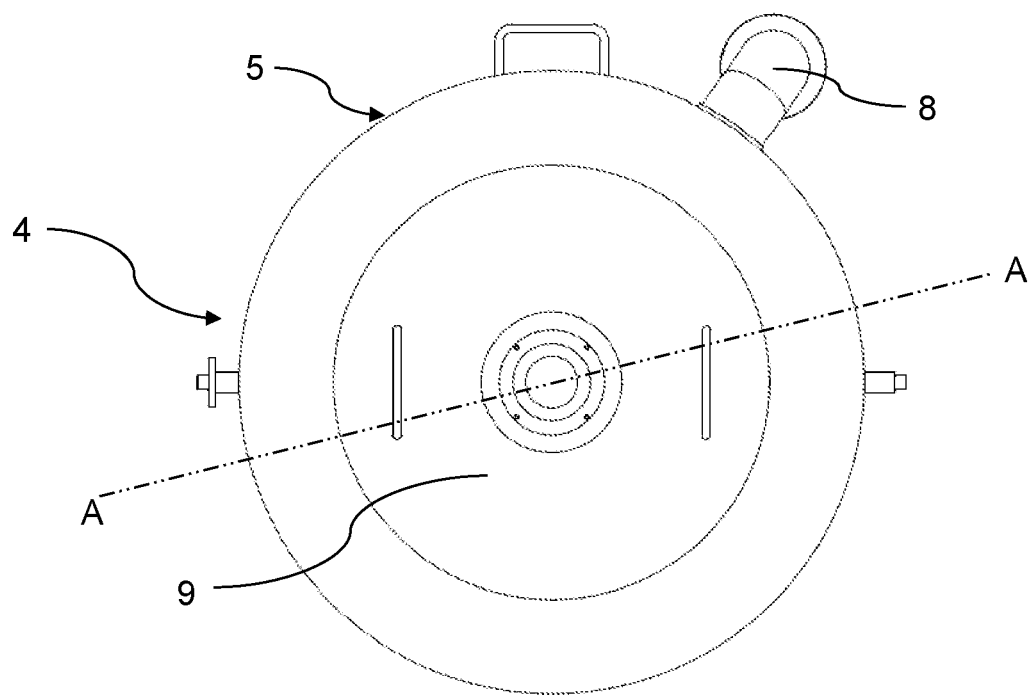
FIG. 8 is a top view of the air disperser of the first embodiment.

As shown in particular in FIGS. 8 and 9, the air disperser according to the embodiment shown comprises an insulating module 9 for releasable connection with the base module 5. Optionally, the insulating module 9 may be connected with the top plate 6 as well.

At one point along the periphery of the base module, a separate air inlet part 8 is connected to the base module 5. Although not shown in detail, the part 8 includes tubing for supply of drying air and is connected to the air inlet 81 either in the tangential or radial direction to the space 45.

In the embodiment shown in FIGS. 2 to 11, the guide vanes 7 are provided with an upper edge having a curved cornute-like shape with a height at the inner radius which is smaller than the height at the outer radius. Other shapes are however conceivable.

In this embodiment, the top of space 45 is closed by a separate top plate 6. The top plate 6, which is optionally a two-part top plate, is connected to the base module by suitable securing means, here bolted to the base module 5, but other releasable connections to the base module 5 are conceivable as well. Also in this embodiment, the top plate 6 has a shape corresponding to the upper edge of the guide vanes 7. Towards the outer edge of the top plate 6 abuts against a stepped portion of the upper portion 52 of the base module 5 via a sealing 57.

Regardless of the shape of the top plate, it may form the positive engagement in the axial direction y, preventing movement of the framework constituted by the set of guide vanes and fixating device.

At least some guide vanes of the set of guide vanes 7 may have different lengths measured in the radial direction. The principle underlying the varying lengths of the guide vanes is described in detail in Applicant's above-mentioned WO 2007/071238 A1. One guide vane has the largest extent in the radial direction and the remaining guide vanes are manufactured from a corresponding shape, only made shorter from the one end edge positioned radially outwards such that all guide vanes of the set of guide vanes have substantially the same extent inwardly when mounted.

Figure 11:
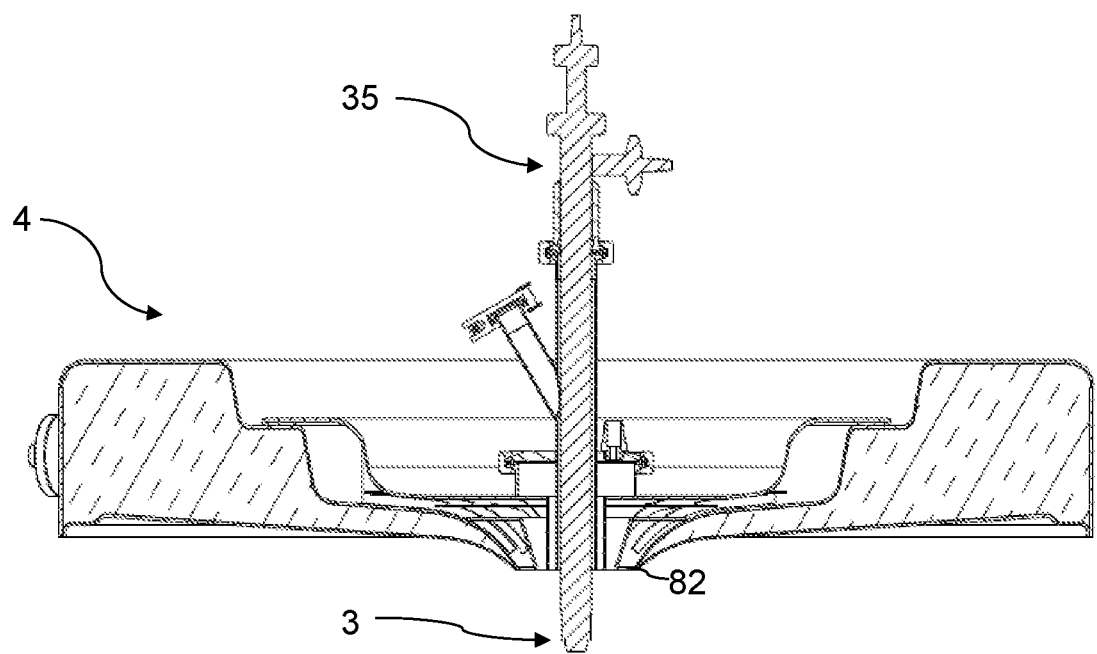
FIG. 11 shows a schematic cross-sectional view of a further embodiment of the air disperser according to the invention.

In FIG. 11, a nozzle lance generally designated 35 of a kind known per se has been inserted to protrude through the air disperser at the air outlet 82. Atomizing means 3 thus provide for atomization of a liquid feed (not shown) during operation of the spray drying apparatus.

As to materials of the parts of the air disperser and the manner of manufacturing, the guide vanes may be made from any suitable material, for instance a metal material, typically steel, and formed by laser cutting. Markings indicating the position in the framework including the set of guide vanes and the fixating device may be provided by laser cutting as well. Other materials that are conceivable are other metal materials or composites, but polymers and ceramic materials may be utilised using manufacturing techniques such as injection moulding, die-casting etc.

Manufacture of the base module 5 and the top plate 6 may be carried out in any suitable manner. One example is described in detail in Applicant's co-pending application filed on the same date as the present application.

The remaining parts of a spray drying apparatus into which an air disperser according to the invention is adapted to be built into are not shown. These parts could for instance correspond to those shown in FIG. 1 designating the prior art. In one particular field of use of the air disperser according to the present invention, the lower portion 51 of the base module is adapted to form the ceiling of the drying chamber of a spray drying apparatus.

The manner of assembling the air disperser may in principle be chosen freely, as long as they fulfil the demands posed.

In one method for assembling an air disperser of a spray drying apparatus is provided, the following steps are included:
  providing the base module 5 with an air inlet 81,
  providing a set of guide vanes 7,
  providing a fixating device 10, 11,
  connecting the set of guide vanes 7 to the fixating device 10, 11 to form a framework, and
  securing the framework releasably relative to the base module 5 to prevent movement of the framework in the axial direction.

In some fields of application, the method may include the additional step of mounting the air disperser in a spray drying apparatus.

In further developments of the method, a top plate is provided as described in the above. The framework of guide vanes and fixating device may be customized to provide a set of guide vanes comprising 12-24 guide vanes, in particular in combination when at least some guide vanes of the set of guide vanes have different lengths in the radial direction. In that case, each guide vane is marked individually to be able to identify and position the guide vanes correctly.

The invention should not be regarded as being limited to the embodiment shown and described in the above but various modifications and combinations of features may be carried out without departing from the scope of the following claims.

The invention claimed is:

1. An air disperser for a spray drying apparatus, having a longitudinal axis defining an axial direction and a radial direction extending perpendicularly to the axial direction, and comprising an air inlet in a base module leading to a space defined within an inner radius and an outer radius, and the space delimited by a top, a bottom and an outer circumferential wall of the base module, a set of guide vanes, and an air outlet at the inner radius adapted to be positioned above a feed outlet from atomizing means, each guide vane of the set of guide vanes having a pre-defined length in the radial direction and being located in the space between the inner and the outer radii, substantially vertically in the axial direction, wherein at least the bottom and the outer circumferential wall of the space are provided by the base module, and wherein the top is provided by a top plate, and wherein the set of guide vanes is releasably secured within a fixating device to form a framework, the fixating device comprising a ring arranged substantially concentrically about the air outlet, and wherein the framework is secured relative to the base module in the axial direction by the top plate.

2. The air disperser according to claim 1, wherein the fixating device comprises two or more rings, each ring having a different radius in the range from the inner radius to the outer radius.

3. The air disperser according to claim 1, wherein the ring or the set of guide vanes allow releasable engagement between the ring and the set of guide vanes in the framework.

4. The air disperser according to claim 3, wherein the set of guide vanes comprise at least one slit formed in each guide vane to receive the ring, and wherein the ring comprises a corresponding slit.

5. The air disperser according to claim 1, wherein the base module comprises protrusions configured to cooperate with corresponding apertures in the ring, and wherein one or more of the base module or the fixating device are configured to prevent rotational movement of the framework, including the set of guide vanes and the fixating device, relative to the base module.

6. The air disperser according to claim 1, wherein the guide vanes of the set of guide vanes are provided with an upper edge having a curved cornute-like shape with a height at the inner radius which is smaller than a height at the outer radius.

7. The air disperser according to claim 1, wherein the top plate closing off the space is releasably connected to the base module.

8. The air disperser according to claim 7, wherein the top plate has a shape corresponding to an upper edge of the guide vanes in part or in full.

9. The air disperser according to claim 1, wherein at least some guide vanes of the set of guide vanes have different lengths measured in the radial direction.

10. The air disperser according to claim 1, wherein the base module is formed as a double-walled unit comprising a lower portion and an upper portion, and wherein the bottom and outer circumferential wall of the space are formed by the upper portion.

11. The air disperser according to claim 10, wherein an insulating material is inserted between the lower portion and the upper portion.

12. The air disperser according to claim 10, wherein the lower portion and the upper portion are connected to each other by means of at least one connecting element.

13. The air disperser according to claim 10, wherein the lower portion of the base module is adapted to form a ceiling of a drying chamber of the spray drying apparatus.

14. The air disperser according to claim 1, wherein an insulating module is provided for releasable connection with the base module and the top plate.

15. The air disperser according to claim 1, wherein a separate air inlet part is connected to the base module.

16. A method for assembling an air disperser in a spray drying apparatus, the method comprising:
  providing a base module with an air inlet and an air outlet,
  providing a set of guide vanes,
  providing a fixating device comprising a ring arranged substantially concentrically about the air outlet,
  connecting the set of guide vanes within the fixating device to form a framework, and
  securing the framework releasably relative to the base module to prevent movement of the framework in an axial direction.

17. The method of claim 16, wherein the framework including the set of guide vanes and the fixating device is secured relative to the base module in at least the axial direction by a top plate.

18. The method of claim 16, wherein the base module comprises protrusions configured to cooperate with corresponding apertures in a ring of the fixating device, wherein the framework including the set of guide vanes and the fixating device is retained from rotational movement relative to the base module.

19. The method of claim 16, wherein the set of guide vanes comprises 4-24 guide vanes.

20. The method of claim 19, wherein at least two guide vanes of the set of guide vanes have different lengths in a radial direction extending perpendicularly to the axial direction, and wherein each guide vane is marked individually.

21. The method of claim 19, wherein the set of guide vanes have increasing lengths seen clockwise or counter-clockwise when forming a framework.

22. The method of claim 16, wherein each guide vane of the set of guide vanes is provided by laser cutting.

23. The method of claim 16, further comprising mounting the air disperser in a spray drying apparatus.

24. The method of claim 16, wherein the set of guide vanes comprises 12-24 guide vanes.

\* \* \* \* \*